United States Patent [19]

Atwood et al.

[11] Patent Number: 5,396,833
[45] Date of Patent: Mar. 14, 1995

[54] METHOD AND APPARATUS FOR PROCESSING DOUGH

[75] Inventors: Harold Atwood, Dolton; James Bartley, Lansing, both of Ill.

[73] Assignee: AM Manufacturing Company, Dolton, Ill.

[21] Appl. No.: 1,450

[22] Filed: Jan. 7, 1993

[51] Int. Cl.⁶ .............................. A47J 37/00
[52] U.S. Cl. .................... 99/353; 99/349; 99/423; 99/443 C
[58] Field of Search .......... 99/353, 355, 349, 386, 99/443 C, 423, 427; 100/215, 216; 425/364 R, 403.1, 517

[56] References Cited

U.S. PATENT DOCUMENTS

| | | | |
|---|---|---|---|
| 3,111,913 | 11/1963 | Mladek et al. | 99/353 |
| 3,146,730 | 9/1964 | White | 99/353 |
| 3,565,015 | 2/1971 | Jorgensen | 99/349 |
| 4,668,524 | 5/1987 | Kirkpatrick | 99/353 |
| 4,905,581 | 3/1990 | Kirkpatrick | 99/353 |
| 4,938,126 | 7/1990 | Rubio et al. | 99/353 |
| 4,958,556 | 9/1990 | Aquino et al. | 99/355 |
| 5,042,369 | 8/1991 | Tamoda | 99/353 |
| 5,060,562 | 10/1991 | Florindez | 99/353 |

*Primary Examiner*—Timothy F. Simone
*Assistant Examiner*—Reginald L. Alexander
*Attorney, Agent, or Firm*—Hill, Steadman & Simpson

[57] ABSTRACT

An apparatus and method for processing dough is provided for automatically processing a large mass of dough into a plurality of smaller, shaped dough pieces. A dough divider is used to receive the large mass of dough and to divide the large mass into smaller dough pieces. A dough rounder is used to receive the smaller dough pieces, round the pieces into dough balls and eject the dough balls serially from a discharge outlet thereof. A first conveyor is provided to receive the ejected dough balls from the discharge outlet and to deposit the dough balls in a predetermined spacing on a second conveyor. The second conveyor intermittently carries the dough balls along a length of the second conveyor. A prepressing device is arranged with a portion for engaging the dough balls being carried on the second conveyor when the second conveyor is stopped, so as to deform the dough balls into thick dough disks. A pressing device for pressing the dough disks into dough pieces of a final desired shape is positioned along the second conveyor, downstream of the prepressing device. One or more heating devices are provided for setting the shaped dough pieces by heating the shaped dough pieces for a predetermined time period. The entire process takes place automatically without human intervention.

25 Claims, 3 Drawing Sheets

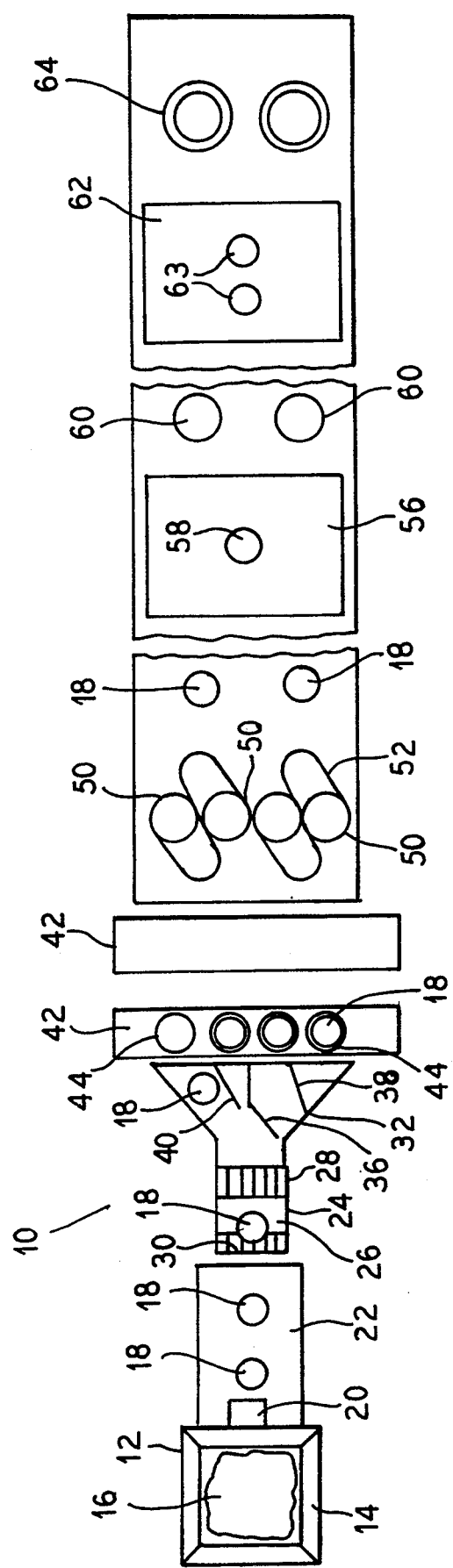

METHOD AND APPARATUS FOR PROCESSING DOUGH

BACKGROUND OF THE INVENTION

The present invention relates to a method and apparatus for processing dough, and in particular, for automatically forming and partially baking finished dough products.

Dough processing equipment is well known. For example, there are a number of devices for dividing a large batch of dough into smaller dough pieces, commonly referred to as dough dividers. Also, there are a number of available devices for accepting small masses of dough and partially forming those masses into balls. These devices are commonly referred to as rounders. Also, combinations of dividers and rounders into a single machine are known wherein a large mass of dough is placed into the device and a round dough ball is provided as an output.

Other devices are known for processing dough, for example for taking dough balls and pressing them into flattened dough pieces. U.S. Pat. No. 4,668,524 discloses such an apparatus.

SUMMARY OF THE PRESENT INVENTION

The present invention provides for an automatic method and apparatus in which a large mass of dough is placed into an initial component of the device wherein smaller masses of dough are divided from the large dough mass and rounded dough balls are ejected from this first component. The dough balls are carried along a conveyor and are deposited, for example, four abreast into a dough carrying tray. The tray is carried on a conveyor and the tray is carried upright until it reaches a guide tube mechanism. At that point, the tray is inverted and the carried dough balls are guided downwardly by the tubes to be deposited in a desired array on a conveyor belt. The conveyor belt carries the round dough balls to a first prepressing mechanism which initially partially flattens the dough balls into thick disks. The conveyor then carries the disks to a final pressing station where the disks are pressed into a desired final form and heat is applied by the press to set the dough pieces in the desired form. The formed pieces are then carried by a conveyor to an oven where they are at least partially baked, thus providing rigidity to the formed pieces. A final conveyor then carries the baked dough pieces to a point of further utilization.

BRIEF DESCRIPTION OF THE DRAWINGS

FIG. 3 is a plan view of the first portion of the apparatus taken generally along the line III—III of FIG. 1.

DETAILED DESCRIPTION OF THE PREFERRED EMBODIMENTS

Figure 1:
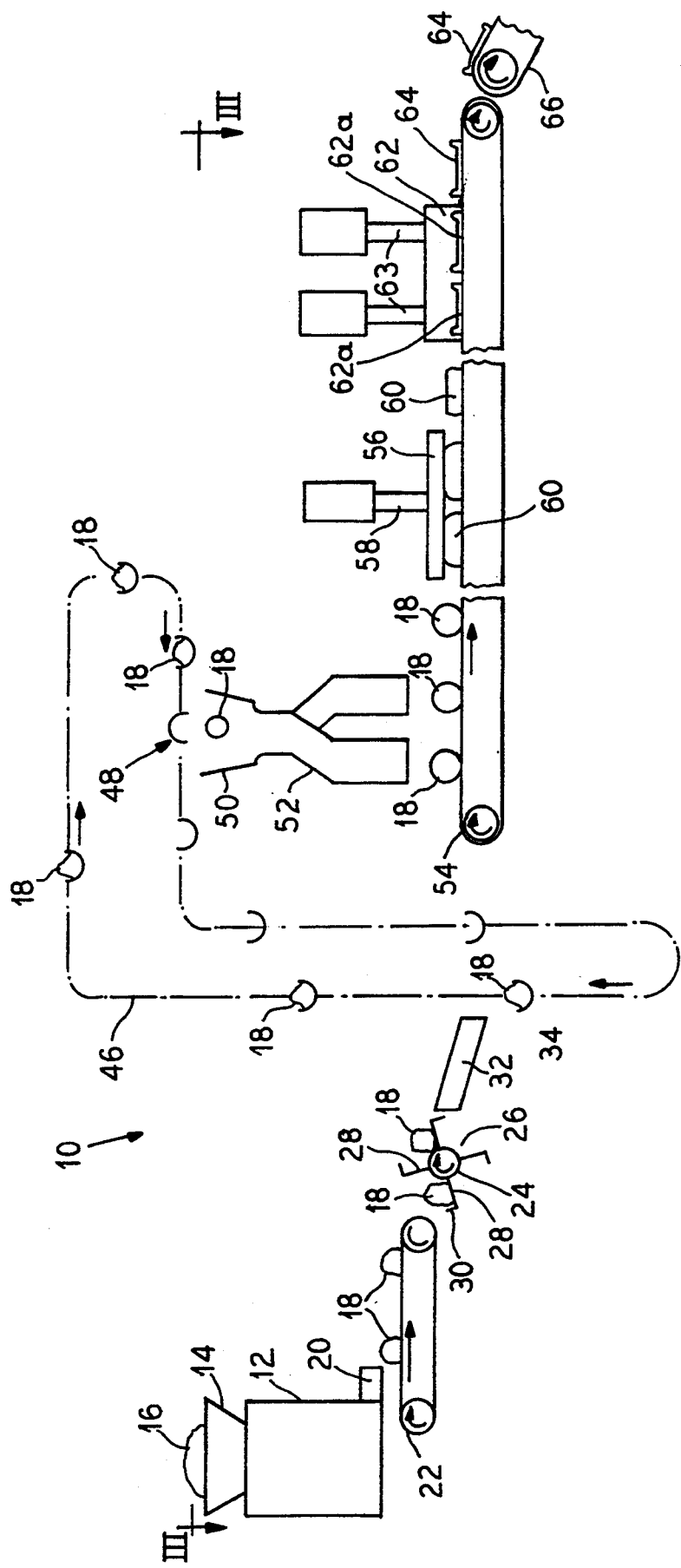
FIG. 1 is a side elevational schematic view of a first portion of the dough forming apparatus of the present invention.
Figure 2:
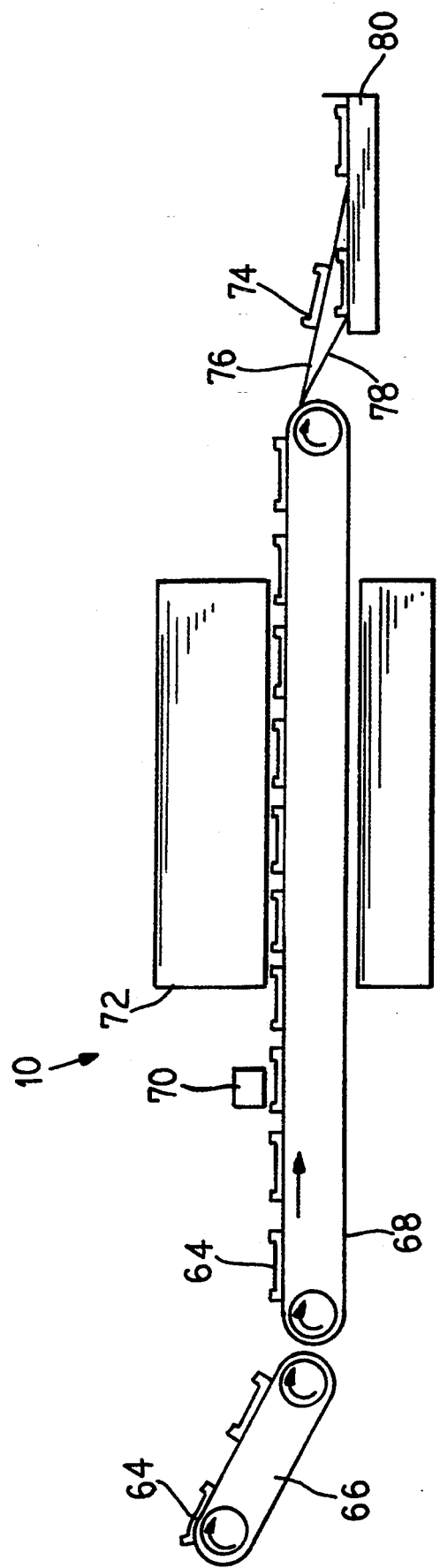
FIG. 2 is a side elevational schematic view of the remaining portion of the dough forming apparatus of the present invention.

A dough forming apparatus is shown generally at 10 in FIGS. 1-3. This apparatus comprises a number of individual components which work together. A first component 12 is a divider/rounder which has a hopper 14 for receiving a large mass of dough 16. Within the divider/rounder 12, the dough mass 16 is divided into smaller dough pieces and is rounded into balls. The balls 18 are dispensed from the discharge chute 20 onto a continuously moving conveyor 22. The conveyor 22 presents the individual dough balls 18 to a conveyor wheel 24 which accepts an individual dough ball into each of four spaces 26 on the wheel. The spaces are defined by radially extending arms 28. Each arm 28 has upturned fingers 30 which hold the dough ball 18 within the space 26 and prevent it from rolling out as the dough ball is loaded onto the wheel. The wheel then individually deposits each dough ball 18 onto a dividing ramp 32 which has a downwardly angled floor 34. The balls 18 are deposited at appropriate time intervals by the conveyor wheel 24. As best seen in FIG. 3, the dividing ramp 32 has three movable walls 36, 38, 40 which can alternate between two positions by pivoting around a vertical axis so as to selectively provide one of four paths through the ramp 32.

When the dough ball 18 leaves the ramp 32, it is deposited onto a tray 42 that has four receptacles 44 spaced in line along the tray. The tray is carried on a continuously moving conveyor 46, however the conveyor 46 moves slowly enough such that four dough balls 18 can be deposited into each tray before the next tray is presented. The conveyor 46 carries the trays vertically and then horizontally, all the while maintaining the tray in a horizontal condition so as to prevent the dough from falling out of the tray. The conveyor 46 is of a size and moves at a speed so as to allow for proofing of the dough balls 18. At one point 48 along the path of the conveyor, the trays are inverted by rotating the tray to cause the four dough balls 18 to drop out of the tray under the force of gravity. This position of the tray is oriented directly above a series of tubes 50. Four tubes 50 are presented in line, each to receive one of the dough balls. The tubes 50 have downwardly extending, and angled guide tubes 52 which direct the dough balls downwardly to deposit them onto the surface of a conveyor 54 in a desired array. The conveyor 54 is an intermittently operated conveyor.

Applicants have found that the dough balls 18, when deposited in this fashion through the guide tubes 52 impact on the surface of the conveyor 54 with sufficient force so as to deform the lower portion of the ball allowing it to be carried on the conveyor without any further flattening of the ball occurring. The round balls are then carried along to a station along the length of the conveyor in which a heated prepressing plate 56 carried on a vertically retractable piston 58, which may be a hydraulic or pneumatic piston, is reciprocated downwardly to press against the dough balls, causing them to deform into thick disks. The heated nature of this prepressing plate 56 provides a searing of the dough to prevent it from sticking to the plate and to form a skin on the dough piece. The plate 56 is then retracted from the dough disks 60 and the conveyor is then restarted and the disks are carried farther along the conveyor. A final pressing and heating plate 62, which also may be carried on retractable pistons 63, is brought downwardly to engage the dough disks 60 and to press them into a final desired shape and to apply heat to the dough pieces to cause them to retain their final pressed shape. In a particular embodiment of the invention, the pressing plate 62 having dies 62a can be used to form pizza crusts thus resulting in a final shaped dough piece 64 having a relatively thin central portion and a raised circumferential rim. When the pressing/heating plate 62 is retracted from engagement with the conveyor 54, the conveyor is restarted and the shaped dough pieces 64 are carried along and deposited onto a transfer conveyor 66. The transfer conveyor deposits the shaped pieces 64 onto another conveyor 68 which carries the pieces past a docking device 70 for perforating the dough pieces to break the surface of the pieces and into an oven 72 where the shaped pieces are at least partially baked. Without the docking device 70, the pieces tend to expand and deform in the oven 72.

After baking, the conveyor 68 deposits the baked pieces 74 onto ramps 76, 78 leading to a conveyor 80 which carries the baked pieces 74 to a point of further utilization.

At the end of a batch, sensor 70 will no longer detect formed dough pieces 64 and, after an appropriate time interval, will cause conveyor 68 and oven 72 to be turned off.

Thus, it is seen that the present invention provides an automatic method and apparatus for accepting a large mass of dough and for processing that dough into a final desired shape and at least partially baking the shaped dough piece. The entire operation, following deposit of the large dough mass into the apparatus is done automatically without human intervention, thus providing a great savings in manufacturing costs for such finished baked dough pieces.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. An apparatus for automatically processing dough comprising:
    a dough divider/rounder for receiving a large mass of dough, dividing said large mass into smaller dough pieces, rounding said pieces into dough balls and ejecting said dough balls serially from a discharge outlet thereof;
    a first conveyor means for receiving said ejected dough balls from said discharge outlet and depositing said doughballs in a predetermined spacing on a second conveyor means, said first conveyor means comprising a conveyor wheel receiving dough balls from said discharge outlet, and a dividing ramp receiving dough balls from said conveyor wheel and having walls for guiding movement of said dough balls down the dividing ramp, and comprising a circulating tray, said dividing ramp arranged to guide dough balls into said tray;
    said second conveyor means for intermittently carrying said dough balls along a length of said second conveyor means;
    a prepressing device having a portion for engaging said dough balls being carried on said second conveyor means, when said second conveyor means is stopped, and deforming said dough balls into thick dough disks;
    a pressing/heating means for pressing said dough disks into dough pieces of a final desired shape and setting said shaped dough pieces by heating said shaped dough pieces for a predetermined time period while said second conveyor means is stopped;
    a third conveyor means for receiving said shaped dough pieces from said second conveyor means and carrying said shaped dough pieces along a length of said third conveyor means; and
    an oven positioned along said length of said third conveyor means for at least partially baking said shaped dough pieces.

2. An apparatus according to claim 1, wherein said third conveyor means comprises at least one continuous belt conveyor.

3. An apparatus according to claim 2, wherein said third conveyor comprises two separate belt conveyors, a first one for carrying said shaped dough pieces through said oven and a second one for carrying said baked dough pieces to a point of further utilization.

4. An apparatus according to claim 3, wherein said third conveyor means further comprises a ramp positioned between said two belt conveyors to assist in transferring said baked dough pieces from said first belt conveyor to said second belt conveyor.

5. An apparatus according to claim 1, wherein said pressing/heating means comprises a horizontal plate having a plurality of shaped dies thereon positioned to engage said dough disks.

6. An apparatus according to claim 1, wherein said prepressing device is a horizontal plate carried on a reciprocable piston.

7. An apparatus according to claim 1, wherein said second conveyor means comprises a continuous belt conveyor and a transfer belt conveyor.

8. An apparatus according to claim 1, wherein said first conveyor means operates continuously.

9. An apparatus according to claim 1, wherein said third conveyor means operates continuously.

10. An apparatus for automatically processing dough comprising:
    a dough divider/rounder for receiving a large mass of dough, dividing said large mass into smaller dough pieces, rounding said pieces into dough balls and ejecting said dough balls serially from a discharge outlet thereof;
    a first conveyor means for receiving said ejected dough balls from said discharge outlet and depositing said dough balls in a predetermined spacing on a second conveyor means, said first conveyor means comprising a conveyor wheel receiving dough balls from said discharge outlet, and a dividing ramp receiving dough balls from said conveyor wheel and having walls for guiding movement of said dough balls down the dividing ramp, and comprising a circulating tray said dividing ramp arranged to guide dough balls into said tray;
    said second conveyor means for intermittently carrying said dough balls along a length of said second conveyor means;
    a prepressing device having a portion for engaging said dough balls being carried on said second conveyor means, when said second conveyor means is stopped, and deforming said dough balls into thick dough disks;
    a pressing/heating means for pressing said dough disks into dough pieces of a final desired shape and setting said shaped dough pieces by heating said shaped dough pieces for a predetermined time period while said second conveyor means is stopped;
    a third conveyor means for receiving said shaped dough pieces from said second conveyor means and carrying said shaped dough pieces along a length of said third conveyor means;

an oven positioned along said length of said third conveyor means for at least partially baking said shaped dough pieces; and wherein said first conveyor means comprises a belt conveyor for receiving said dough balls from said discharge outlet, and said wheel conveyor is controlled for providing a timed deposit of said dough balls, into said dividing ramp and said walls are movable to direct said balls along a selected path, said tray arranged for receiving a plurality of said dough balls from said dividing ramp in a spaced horizontal fashion, a plurality of guide tubes for receiving said dough balls from said tray, said guide tubes guiding said dough balls into said predetermined spacing on said second conveyor means.

11. An apparatus according to claim 10, wherein said tray is carried on a conveyor to move vertically and horizontally from where said tray receives said dough balls to where said dough balls are directed into said guide tubes.

12. An apparatus for automatically processing dough comprising:
- a dough divider for receiving a large mass of dough and dividing said large mass into smaller dough pieces;
- a dough rounder for receiving said smaller dough pieces, rounding said pieces into dough balls and ejecting said dough balls serially from a discharge outlet thereof;
- a first conveyor means for receiving said ejected dough balls from said discharge outlet and depositing said dough balls into a predetermined spacing on a second conveyor means, said first conveyor means comprising a vertically arranged chute means for dropping said dough balls onto said second conveyor means;
- said second conveyor means for intermittently carrying said dough balls along a length of said second conveyor means;
- means for stopping and starting said second conveyor means;
- a prepressing device spaced downstream from said chute means along said second conveyor means and having a portion for engaging said dough balls being carried on said second conveyor means, when said second conveyor means is stopped, and deforming said dough balls into thick dough disks;
- a pressing means for pressing said dough disks into dough pieces of a final desired shape; and
- a heating means for setting said shaped dough pieces by heating said shaped dough pieces for a predetermined time period.

13. An apparatus according to claim 12, wherein said dough divider and dough rounder comprise a single component.

14. An apparatus according to claim 12, wherein said heating means comprises a first heating device associated with said pressing means to provided heating to said dough piece while said pressing means is in engagement therewith.

15. An apparatus according to claim 12, wherein said heating means comprises an oven through which said shaped dough pieces are carried to at least partially bake said dough pieces.

16. An apparatus according to claim 12 further comprising a second means for heating said portion of said prepressing device.

17. An apparatus according to claim 12, wherein said prepressing device is a horizontal plate carried on a reciprocable piston.

18. An apparatus according to claim 12, wherein said first conveyor means comprises a conveyor wheel receiving dough balls from said discharge outlet, and a dividing ramp receiving dough balls from said conveyor wheel and having walls for guiding movement of said dough balls down the dividing ramp and comprising a circulating tray, said dividing ramp arranged to guide dough balls into said tray.

19. An apparatus for automatically processing dough comprising:
- a dough divider/rounder for receiving a large mass of dough, dividing said large mass into smaller dough pieces, rounding said pieces into dough balls and ejecting said dough balls serially from a discharge outlet thereof;
- a first conveyor means for receiving said ejected dough balls from said discharge outlet and depositing said dough balls in a predetermined spacing on a second conveyor means, said first conveyor means comprising a conveyor wheel receiving dough balls from said discharge outlet, and a dividing ramp receiving dough balls from said conveyor wheel and having walls for guiding movement of said dough balls down the dividing ramp, and comprising a circulating tray said dividing ramp arranged to guide dough balls into said tray;
- said second conveyor means for intermittently carrying said dough balls along a length of said second conveyor means;
- a prepressing device having a portion for engaging said dough balls being carried on said second conveyor means, when said second conveyor means is stopped, and deforming said dough balls into thick dough disks;
- a pressing/heating means for pressing said dough disks into dough pieces of a final desired shape and setting said shaped dough pieces by heating said shaped dough pieces for a predetermined time period while said second conveyor means is stopped;
- a third conveyor means for receiving said shaped dough pieces from said second conveyor means and carrying said shaped dough pieces along a length of said third conveyor means;
- an oven positioned along said length of said third conveyor means for at least partially baking said shaped dough pieces; and
- wherein said conveyor wheel has radially extending arms 28 forming spaces therebetween for receiving a single dough ball; and
- said walls for guiding movement are pivotable to direct said single dough balls into select positions on said circulating tray.

20. An apparatus according to claim 19, and further comprising a control means for selectively pivoting said walls, and said tray comprises four positions thereon for dough balls, and said control means pivoting said walls to allocate dough balls to each of said four positions on said tray.

21. An apparatus for automatically processing dough comprising:

a dough divider for receiving a large mass of dough and dividing said large mass into smaller dough pieces;

a dough rounder for receiving said smaller dough pieces, rounding said pieces into dough balls and ejecting said dough balls serially from a discharge outlet thereof;

a first conveyor means for receiving said ejected dough balls from said discharge outlet and depositing said dough balls into a predetermined spacing on a second conveyor means;

said second conveyor means for intermittently carrying said dough balls along a length of said second conveyor means;

a prepressing means having a heated portion for engaging and searing said dough balls being carried on said second conveyor means, and deforming said dough balls into thick dough disks;

a pressing means for pressing said dough disks into dough pieces of a final desired shape; and a heating means for setting said shaped dough pieces by heating said shaped dough pieces for a predetermined time period.

22. An apparatus according to claim 21, wherein said prepressing means comprises a horizontal plate carried on a reciprocable piston.

23. An apparatus according to claim 21, wherein said first conveyor means comprises a conveyor wheel receiving dough balls from said discharge outlet, and a dividing ramp receiving dough balls from said conveyor wheel and having walls for guiding movement of said dough balls down the dividing ramp and comprising a circulating tray, said dividing ramp arranged to guide dough balls into said tray.

24. An apparatus for automatically processing dough comprising:

a dough divider for receiving a large mass of dough and dividing said large mass into smaller dough pieces;

a dough rounder for receiving said smaller dough pieces, rounding said pieces into dough balls and ejecting said dough balls serially from a discharge outlet thereof;

a first conveyor means for receiving said ejected dough balls from said discharge outlet and depositing said dough balls into a predetermined spacing on a second conveyor means;

said second conveyor means for intermittently carrying said dough balls along a length of said second conveyor means;

a prepressing means having a heated portion for engaging and searing said dough balls being carried on said second conveyor means, and deforming said dough balls into thick dough disks;

a pressing means for pressing said dough disks into dough pieces of a final desired shape;

a heating means for setting said shaped dough pieces by heating said shaped dough pieces for a predetermined time period; and wherein said pressing means comprises a horizontal plate having a plurality of shaped dies thereon positioned to engage said dough disks.

25. An apparatus for automatically processing dough comprising:

a dough divider for receiving a large mass of dough and dividing said large mass into smaller dough pieces;

a dough rounder for receiving said smaller dough pieces, rounding said pieces into dough balls and ejecting said dough balls serially from a discharge outlet thereof;

a first conveyor means for receiving said ejected dough balls from said discharge outlet and depositing said dough balls in a predetermined spacing on a second conveyor means, said first conveyor means comprising a vertically arranged chute means for dropping said dough balls onto said second conveyor means;

said second conveyor means for intermittently carrying said dough balls along a length of said second conveyor means;

means for stopping and starting said second conveyor means;

a prepressing device spaced downstream from said chute means along said second conveyor means and having a portion for engaging said dough balls being carried on said second conveyor means, when said second conveyor means is stopped, and deforming said dough balls into thick dough disks;

a pressing means for pressing said dough disks into dough pieces of a final desired shape;

a heating means for setting said shaped dough pieces by heating said shaped dough pieces for a predetermined time period; and wherein said pressing means comprises a horizontal plate having a plurality of shaped dies thereon positioned to engage said dough disks.

* * * * *